United States Patent [19]

Kraus

[11] 4,318,745
[45] Mar. 9, 1982

[54] PROCESS AND PLANT FOR PRODUCING HYDRAULIC CEMENT

[75] Inventor: Fritz Kraus, Vöcklabruck, Austria

[73] Assignee: Voest-Alpine Aktiengesellschaft, Linz, Austria

[21] Appl. No.: 196,779

[22] Filed: Oct. 14, 1980

[30] Foreign Application Priority Data

Oct. 19, 1979 [AT] Austria ................................ 16817/79

[51] Int. Cl.³ ................................................ C04B 7/02
[52] U.S. Cl. ...................................... 106/100; 432/13; 432/14; 432/106; 432/111
[58] Field of Search ..................... 106/100; 432/13, 14, 432/106, 111

[56] References Cited

U.S. PATENT DOCUMENTS 4,022,629 5/1977 Garrett et al. ...................... 106/100

FOREIGN PATENT DOCUMENTS 2541564 3/1977 Fed. Rep. of Germany ...... 106/100

*Primary Examiner*—James Poer
*Attorney, Agent, or Firm*—Kurt Kelman

[57] ABSTRACT

A pulverized raw mixture is mixed in a vertical calciner with comminuted preheated fuel, which is burned in said vertical calciner to supply heat to said pulverized raw mixture in order to calcine the same. Hot exhaust gases from said calciner are used to preheat said pulverized raw mixture before it enters said calciner. The pulverized mixture which has been calcined is entrained out of said calciner in said exhaust gases and is separated from said exhaust gases and then fed to a rotary kiln and is burned therein to produce cement clinker. The cement clinker is cooled in a cooling air stream, which is thus heated. An exhaust gas stream consisting of at least part of the exhaust gases from the rotary kiln is fed into said calciner from below. The calciner is supplied with combustion air consisting of at least part of the thus heated cooling air. Said fuel is comminuted in contact with said exhaust gas stream and is then entrained into said calciner in said exhaust gas stream.

7 Claims, 1 Drawing Figure

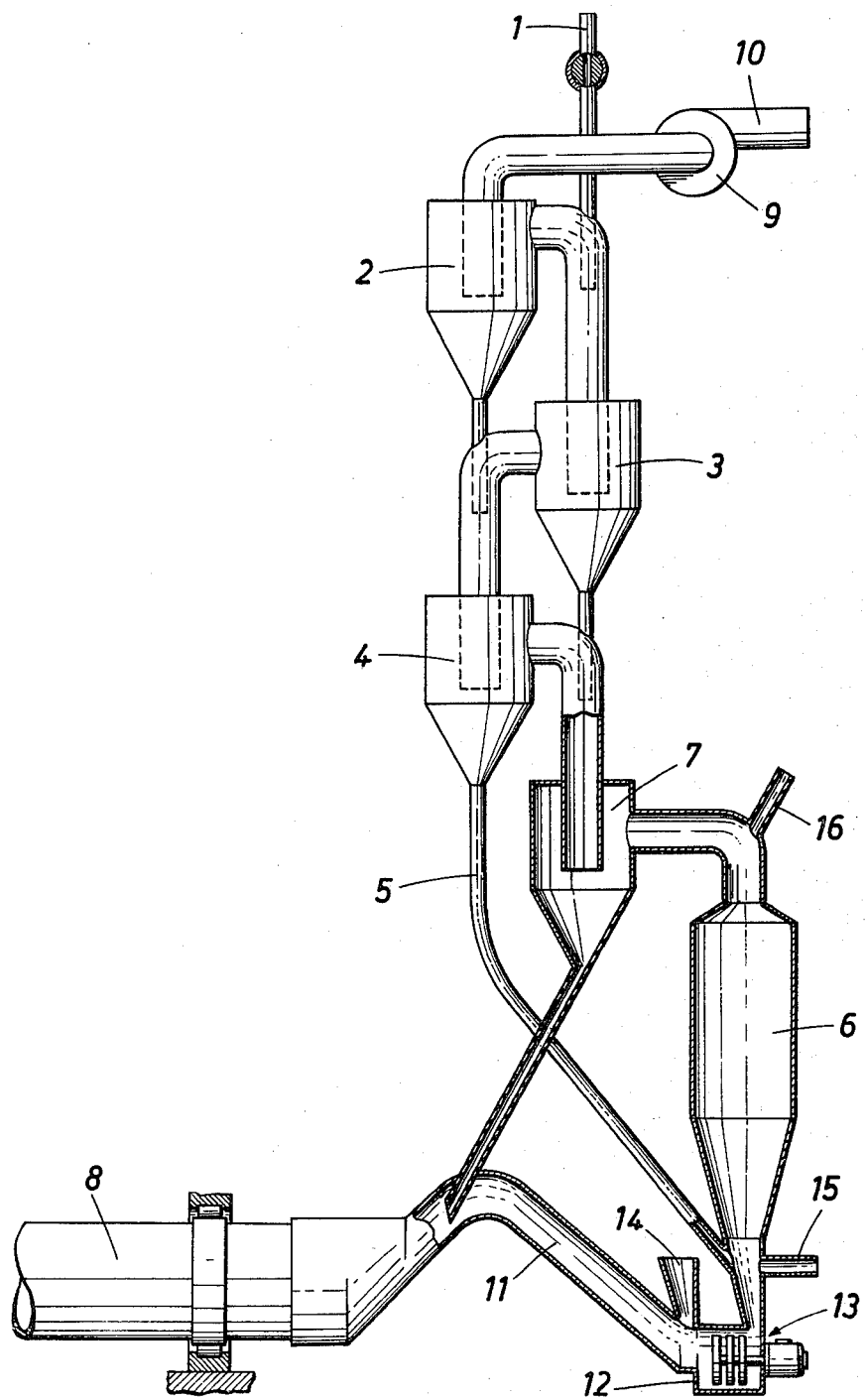

PROCESS AND PLANT FOR PRODUCING HYDRAULIC CEMENT

This invention relates to a process of producing hydraulic cement, in which a pulverized raw mixture is heated by a hot exhaust gas stream from a vertical calciner and in that calciner is mixed with comminuted and preheated fuel which is burned to supply additional heat to the pulverized raw mixture. The latter is entrained out of the calciner in the hot exhaust gas stream and separated from the latter and then burned in a rotary kiln to form cement clinker, which is subsequently cooled with cooling air. At least part of the exhaust gases from the rotary kiln is introduced into the calciner from below and the latter is supplied with at least part of the heated cooling air as combustion air. The invention relates also to a plant for carrying out the process.

Whereas a rotary kiln is highly suitable for producing cement clinker, the preheating and calcining of the pulverized raw mixture in a rotary kiln are necessarily too slow and too expensive. For this reason it has become usual to preheat and calcine the pulverized raw mixture outside the rotary kiln. To that end, the rotary kiln is preceded by a so-called calciner, in which the preheated pulverized raw mixture is mixed with pulverized fuel, which is then burned to supply the pulverized raw mixture with the heat required to expel the carbon dioxide from the limestone. Because the rotary kiln is no longer used for calcining, that step can be carried out with lower-grade fuel; this is another advantage afforded by the process in which calcining is carried out as a preliminary step. On the other hand, the solid fuels to be supplied to the calciner must be pretreated before by being dried and pulverized so that heat can actually be made available in the quantities required for calcining. For this reason, lower-grade solid fuels can be used for calcining outside the rotary kiln but that use involves a comparatively high expenditure, which offsets the economy afforded by the use of lower-grade fuel.

The fuel is preheated so that it can be utilized to a higher degree. It is known from German Early Disclosure No. 25 41 564 to entrain the ground fuel in a duct in the heated cooling air taken from the cooler which succeeds the rotary kiln. That heated cooling air preheats the fuel and can also be used as combustion air. Because the sensible waste heat content of the cooling air is not sufficient to heat the fuel to the desired temperature, an additional heating of the fuel is required. Before entering the calciner, the fuel is conducted through an annular chamber, which surrounds the calciner so that the hot exhaust stream from the rotary kiln as it flows through the calciner delivers heat through the wall of the calciner to the fuel particles. But this stepwise preheating of the fuel does not eliminate the need for a special pretreatment of the fuel, particularly by drying, particularly when the blowing duct communicates with an impact mill, which is fed, e.g., with large lumps of coal, which is comminuted and entrained by the separating air stream flowing in the blowing duct. For this reason, low-grade fuel cannot be used in the known plant unless the fuel has been pretreated. Besides, the feeding of the fuel through annular chambers which surrounds the calciner and define vortex chambers requires an expensive structure, which can hardly justify the requirements that are due to the high heat loading.

It is an object of the invention so to improve a process of the kind described first hereinbefore that even lower-grade fuel having a relatively high moisture content can be used in conventional, simple calciners without need for a special pretreatment.

This object is accomplished according to the invention in that the fuel is comminuted in the exhaust gas stream which is conducted from the rotary kiln to the calciner and used to entrain the comminuted fuel into the calciner.

The fuel need not be predried because it is comminuted in the hot exhaust gas stream from the rotary kiln and owing to the high temperature difference dries quickly as it is comminuted; in this way the heat of evaporation is extracted from the hot exhaust gases coming from the kiln so that they are cooled and there can be no hot spots. Additional heat is supplied to the comminuted fuel as it is entrained in the exhaust gas stream. In this way, a higher utilization of the fuel is ensured so that the fuel need not be pulverized and a grinding to a particle diameter of, e.g., 20 mm, is sufficient.

To prevent an ignition of the fuel until it is about to enter the calciner, the burning operation in the rotary kiln is to be conducted so that the exhaust gases from the kiln have only a low oxygen content. When the burning operation is conducted in this way and combustion air is supplied to the exhaust gas stream after the fuel has been comminuted therein, then the fuel will be ignited as desired. It is apparent that in this way the heat required to expel the carbon dioxide can be supplied without a high expenditure to the pulverized raw mixture, which is throughly mixed with the fuel entering the calciner from below. The combustion air admixed to the exhaust gas stream results in an additional cooling of the exhaust gas stream and the temperature of the rotary kiln exhaust gas stream entering the calciner can be controlled by a control of the temperature of the combustion air. It is apparent that with an appropriate design the entire exhaust gas from the rotary kiln can be used to dry and preheat the fuel so that it is sufficient to convey the fuel over short distances and the gases are used economically because all gases which become available will be preserved for the process.

Because the process according to the invention ensures that even lower-grade fuels will be utilized to a high degree, part of the high-grade fuel used in the rotary kiln may be replaced by a lower-grade fuel if, according to an additional feature of the invention, more fuel is comminuted in the exhaust gas stream supplied from the rotary kiln to the calciner than is required to calcine the pulverized raw mixture because in that case the surplus fuel will be fed to the rotary kiln together with the calcined pulverized mixture.

In a plant comprising a vertical calciner, which succeeds a multistage heat exchanger that is supplied with the hot exhaust gases from the calciner and serves to heat the pulverized raw mixture to be treated, a feeder which succeeds a mill and serves to supply comminuted fuel, a separator which is disposed in the exhaust gas stream from the calciner and serves to feed calcined pulverized mixture to the rotary kiln, and an exhaust gas duct leading from the rotary kiln into the calciner from below, the process can be carried out in a very simple manner if the housing of the mill constitutes part of the exhaust gas duct leading from the rotary kiln and the feeder for the fuel consists of the exhaust gas duct and serves to convey the fuel. That arrangement ensures a compact structure with relatively short lines whereas the design of the calciner need not be changed. For this reason, the new process can be carried out even in existing plants when they have been properly converted.

The drawing is a block circuit diagram representing a plant designed according to the invention and used to carry out the process.

A pulverized raw mixture to be treated is fed to a multistage heat exchanger through a duct 1, which is controlled by a shut-off valve. In the embodiment shown by way of example, the heat exchanger comprises three series-connected cyclones 2, 3 and 4. The preheated pulverized raw mixture leaving the cyclone 4 is at a temperature of about 800° to 850° C. and is then supplied in a duct 5 to a calciner 6, which is be fed with fuel for generating additional heat. That fuel is mixed with the preheated pulverized raw mixture in the calciner 6 so that the heat generated by the combustion of the fuel is properly delivered to the pulverized raw mixture. As a result, the carbon dioxide is expelled from the limestone to de-acidify the latter. That de-acidification is completed when a temperature somewhat about 900° C. has been reached. The pulverized raw mixture is entrained by the hot exhaust gas stream into a cyclone separator 7, in which the mixture is separated from the exhaust gas stream, and is then fed to a rotary kiln 8. The hot exhaust gases from the calciner are then substantially free from solids flow from the cyclone 7 to the cyclone 4 and entrain the pulverized raw mixture from the cyclone 3 into the cyclone 3 into the cyclone 4. In the latter, the pulverized raw mixture is separated from the gas stream and is then fed to the calciner 6, as described before. Entraining pulverized raw mixture from the cyclone 2, the hot exhaust gas flows from the cyclone 4 to the cyclone 3, in which the operation carried out in the cyclone 4 is repeated. The operation carried out in the cyclone 3 is repeated in the cyclone 2. In this way, the hot exhaust gas from the calciner 6 is cooled in stages and is caused to deliver heat to the pulverized raw mixture, and the latter is heated in several stages. A blower 9 in the exhaust gas duct 10 ensures a suitable velocity of flow of the exhaust gas.

The substantially precalcined pulverized raw mixture from the cyclone separator 7 is heated up to about 1400° C. in the rotary kiln in order to initiate the chemical transformation of the raw materials to the clinker minerals in an exothermic burning operation. The burnt cement clinker is then cooled approximately to ambient temperature by a cooling air stream in a conventional cooler, which is not shown for the sake of clarity.

At least part of the exhaust gas from the rotary kiln 8 is fed through a duct 11 to the housing 12 of the beater mill 13, in which the solid fuel is comminuted is fed through a fuel feeder 14 into the mill 13 and in the latter is comminuted by beaters. The exhaust gas from the kiln entrains the comminuted fuel into the calciner 6 from below. In the calciner, the fuel is mixed as described with the pulverized raw mixture from the duct 5. In this way, the comminuted fuel is entrained and dried further and preheated by the hot exhaust gas stream from the rotary kiln 8. For this reason, comparatively low-grade fuel may be used. The oxygen required for the combustion of the fuel which has only been crumbled down is supplied as the residual oxygen still contained in the exhaust gas from the kiln and preferably as the oxygen content of the cooling air which has been heated in cooling the clinker and can be supplied to the calciner 6 in ducts 15 and 16.

If more fuel is fed to the mill through the fuel feeder 14 than is required to calcine the pulverized raw mixture which has been preheated, and the plant is properly designed, part of the fuel will enter the rotary kiln 8 together with the pulverized raw mixture which has been precalcined and that part of the fuel will contribute to or effect the heating of the pulverized raw mixture to the sintering temperature in the rotary kiln. As a result, at least part of the high-grade fuel used in the rotary kiln can be replaced by lower-grade fuel because the latter is pretreated in the plant itself.

In the plant according to the invention, the pulverized raw mixture which has been preheated can quickly be heated to a temperature in the range from 850° to 950° C. and can be maintained at temperatures in that range by a concentrated supply of heat. As a result, the desired de-acidification of the pulverized raw mixture can be effected very quickly. The temperature to which the pulverized raw mixture is preheated will obviously depend also on the temperature of the exhaust gases from the calciner. This will cause the pulverized raw mixture to be preheated quickly to a high temperature so that constant conditions in the calciner will be ensured.

As lower-grade fuels can be used to calcine the pulverized raw mixture, this can be accomplished even by brown coals, which otherwise cannot be used for this purpose, and the need for an expensive pretreatment is eliminated.

Whereas the drawing does not show means for controlling the gas rates, the proportioning of the fuel and the control of the supply of the pulverized raw mixture, for the sake of clearness, such means will obviously be incorporated. It may be mentioned in this connection that the embodiment shown and described has been selected only by way of example and may be modified, i.e., in that only part of the exhaust gas stream from the rotary kiln is passed through the mill housing.

What is claimed is:

1. In a process of producing hydraulic cement comprising mixing a pulverized raw mixture in a vertical calciner with comminuted preheated fuel, burning said fuel in said calciner to supply heat to said pulverized raw mixture in order to calcine the same, using hot exhaust gases from said calciner to preheat said pulverized raw mixture before it enters said calciner, entraining said pulverized mixture which has been calcined in said exhaust gases to carry said mixture out of said calciner, separating said calcined pulverized mixture from said exhaust gases and then feeding said pulverized mixture to a rotary kiln, burning said pulverized mixture in said rotary kiln to produce cement clinker, cooling said cement clinker in a cooling air stream, which is thus heated, feeding an exhaust gas stream consisting of at least part of the exhaust gases from said rotary kiln into said calciner from below, and supplying said calciner with combustion air consisting of at least part of the thus heated cooling air, the improvement residing in that said fuel is comminuted in contact with said exhaust gas stream and is then entrained into said calciner by said exhaust gas stream.

2. The improvement set forth in claim 1, wherein combustion air is admixed to said exhaust gas stream after said fuel has been comminuted in contact with said exhaust gas stream.

3. The improvement set forth in claim 1, wherein
more fuel is comminuted in said exhaust gas stream than is required to calcine said pulverized raw mixture and
surplus fuel is fed to the rotary kiln together with the raw mixture which has been calcined.

4. In a plant for producing hydraulic cement comprising
a vertical calciner which is operable to mix a pulverized raw mixture with comminuted preheated fuel, to burn said fuel to supply heat to said pulverized raw mixture in order to calcine the same, and to produce hot exhaust gases for entraining the thus calcined pulverized mixture out of said calciner,
preheating means for preheating said pulverized raw mixture with said hot exhaust gases from said calciner before said pulverized raw mixture enters said calciner,
a separator for separating said calcined pulverized mixture from said exhaust gases,
a rotary kiln arranged to receive said calcined pulverized mixture from said separator and operable to burn said pulverized mixture to produce cement clinker,
cooling means for cooling said cement clinker in a cooling air stream, which is thus heated,
gas-feeding means for feeding an exhaust gas stream consisting of at least part of the exhaust gases from said rotary kiln into said calciner from below, and
air-feeding means for supplying said calciner with at least part of the thus heated cooling air,
the improvement residing in the provision of comminuting means arranged to receive said exhaust gas stream and operable to comminute said fuel in contact with said exhaust gas stream and to cause said comminuted fuel to be entrained in said exhaust gas stream.

5. The improvement set forth in claim 4, wherein said preheating means comprise a multi-stage heat exchanger adapted to be heated with said hot exhaust gases from said calciner.

6. The improvement set forth in claim 4, wherein
said comminuting means comprise a mill and
a feeder is provided for feeding comminuted fuel from said mill to said calciner.

7. The improvement set forth in claim 4, wherein
said gas-feeding means comprise a duct for feeding said exhaust gases from said rotary kiln into said calciner from below,
said comminuting means comprise a mill having a housing, which constitutes part of said duct and
said duct comprises a pneumatic conveyor for feeding said comminuted fuel to said calciner.

* * * * *